June 11, 1929.  J. G. CAPSTAFF  1,716,417
METHOD AND MEANS FOR JUDGING FILM
Filed March 22, 1926  2 Sheets-Sheet 1
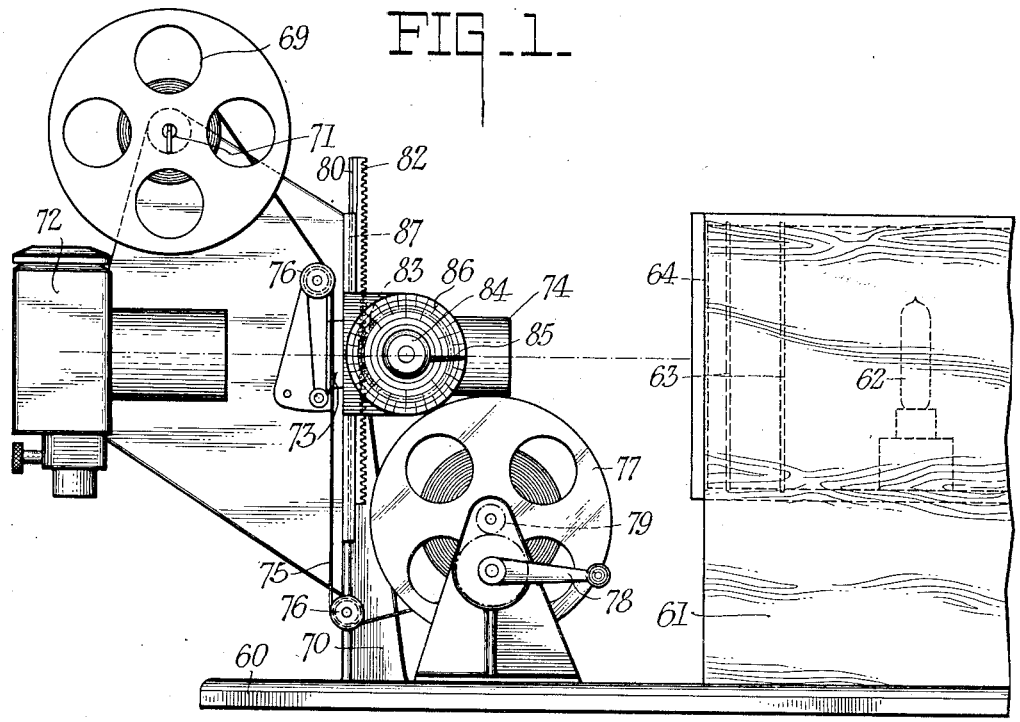
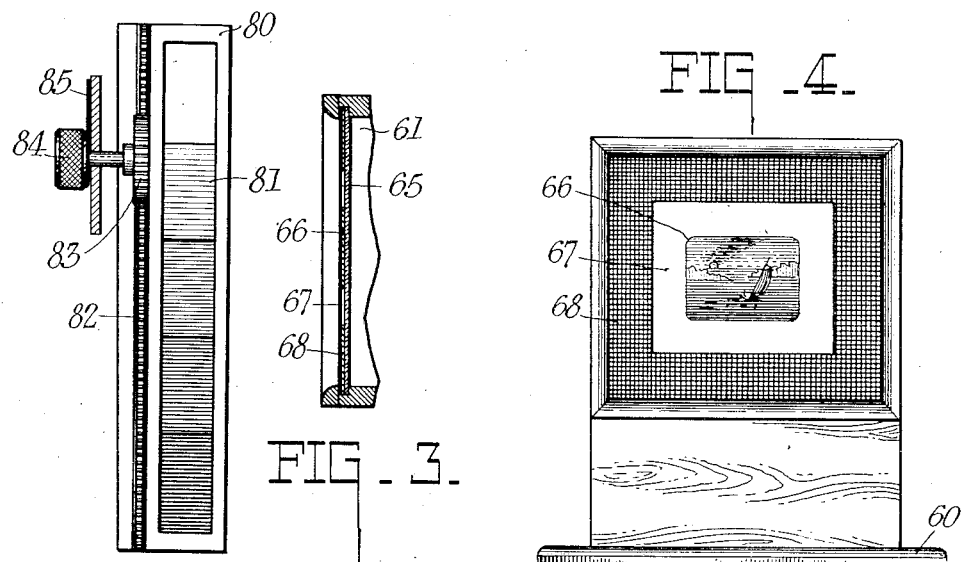
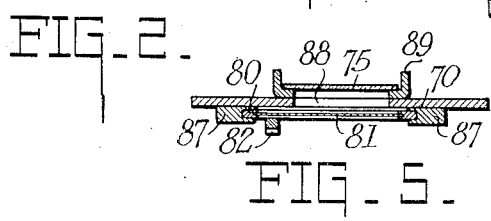
INVENTOR,
John G. Capstaff,
BY
his
ATTORNEYS.

June 11, 1929.   J. G. CAPSTAFF   1,716,417
METHOD AND MEANS FOR JUDGING FILM
Filed March 22, 1926   2 Sheets-Sheet 2
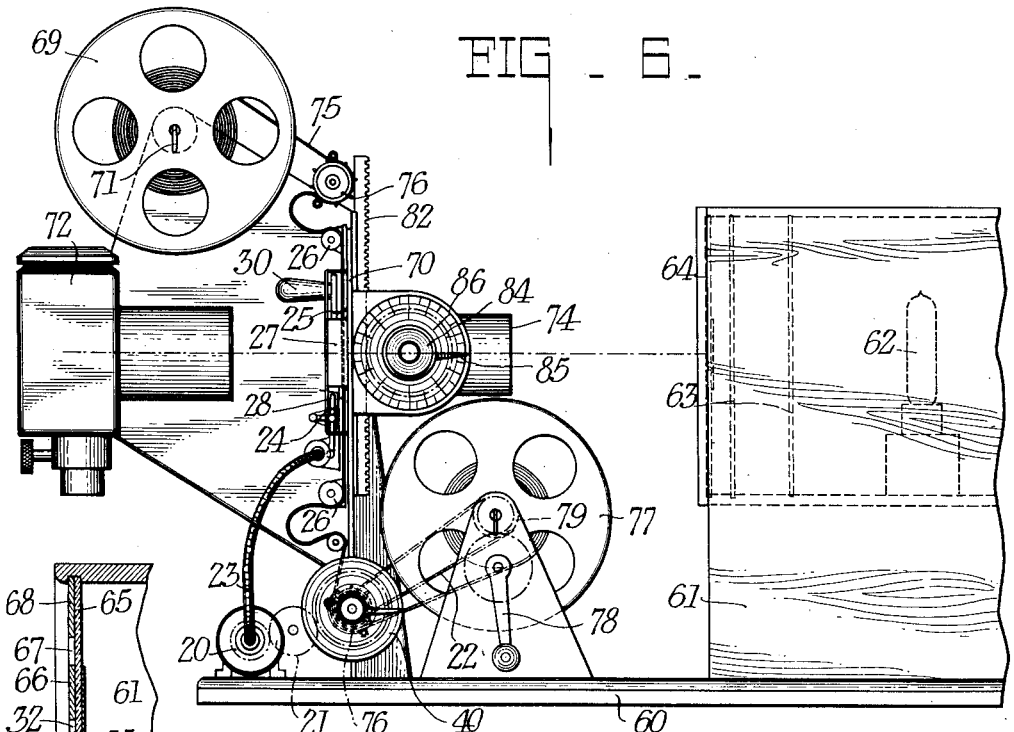
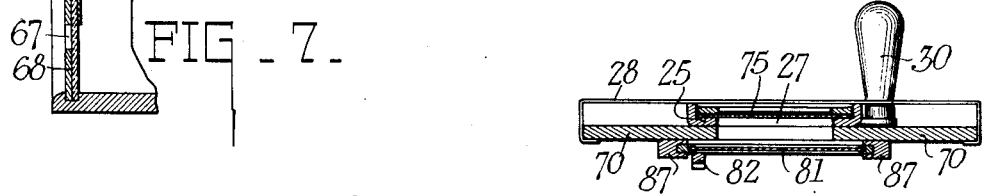
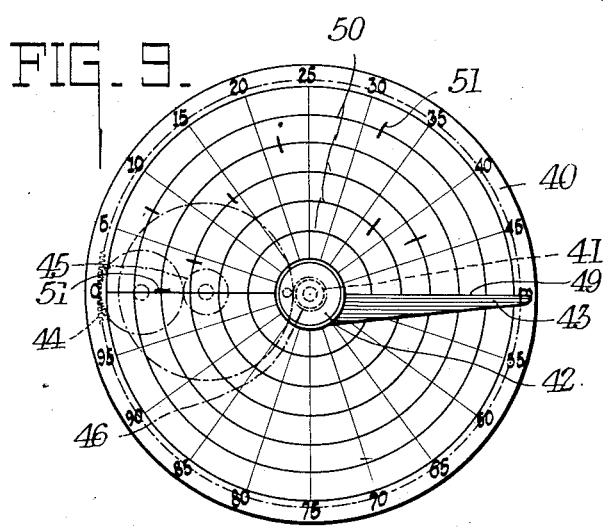
INVENTOR,
John G. Capstaff,
BY P. L. Stutchfield
his N. M. Perrins
ATTORNEYS.

Patented June 11, 1929.

1,716,417

UNITED STATES PATENT OFFICE.

JOHN GEORGE CAPSTAFF, OF ROCHESTER, NEW YORK, ASSIGNOR TO EASTMAN KODAK COMPANY, OF ROCHESTER, NEW YORK, A CORPORATION OF NEW YORK.

METHOD AND MEANS FOR JUDGING FILM.

Application filed March 22, 1926. Serial No. 96,654.

This invention relates to an apparatus for the determination of the contrast and density of a photographic image.

Instruments for this purpose usually measure with more or less accuracy the density of selected portions such as the high lights, or they integrate the total transmitted light. Such measurements, are often misleading. Many scenes having unusual lighting effects, high contrasts, or other peculiarities would be misjudged by such determinations. A cellar scene or other dimly lighted interior would be mistaken for an under exposure, while a scene having highly reflective objects against a dark background might be judged to be too contrasty from overdevelopment.

The purpose of the present invention is to provide an instrument in which the images are projected and observed under uniform conditions and whereby they may be judged by standards approximating those of actual commercial projection. Note is made of their correct printing value and the data used in making the final print.

The above and other objects are attained by an instrument which, in the forms herein described, is substantially the same as an embodiment disclosed in my Patent No. 1,690,617, issued November 6, 1928, but which is not now claimed therein the form shown in Figs. 6 to 9 including modifications not shown in said application.

As described in said application, the instrument is particularly useful in the making of duplicate prints and the film to be inspected is preferably a positive motion picture film either printed from a negative and from which a duplicate negative is to be made, or a positive made by a reversal process from the original camera exposure and from which in turn another positive is to be made.

Reference will now be made to the accompanying drawings, wherein the same reference characters refer to the same parts throughout and in which,—

Fig. 1 is a side elevation of one embodiment of the invention;

Fig. 2 shows one form of adjustable density wedge used in the instrument;

Fig. 3 is a section of the projection screen;

Fig. 4 is a front view of the screen;

Fig. 5 is a section of the wedge and the projection window with which it is used;

Fig. 6 is a side elevation showing certain modifications;

Fig. 7 is a section of a modified screen;

Fig. 8 is a section of a modified projection window structure; and

Fig. 9 is a view of an indicating card as marked by the operator.

Upon a base 60 I support a housing 61 containing a lamp 62 in front of which are two light diffusing screens 63, such as ground glass, or such neutral light diffusing sheets as may be necessary to balance the illumination and a small projection screen 64. The latter consists of an opal glass sheet 65 to the front of which is centrally attached an opaque sheet of material 66. This may be a heavy coating of paint. The front surface is highly reflective and may be white or have a metallic lustre. Around this central area 66 is a clear border 67, and surrounding this is a black opaque border 68.

The base 60 also carries a support 70 carrying a film reel support 71 and a projection lamp house 72 in front of which is a film gate 73 and objective 74. Film 75 may be guided from a reel 69 on the support 71 past the gate 88 by means of guide sprockets 76 and guideway 89 and thence to a take up reel 77, where it may be moved by handle 78 and multiplying gear 79. Between the gate and objective is mounted a frame 80 sliding in guides 87 and carrying a density wedge 81 and adjustable vertically by means of track 82 and pinion 83, the latter being actuated by thumb nut 84, carrying a pointer 85 movable over scale 86.

The film to be judged is passed through this projector and a typical frame from each scene is projected upon the area 66. The parts of the apparatus are so proportioned that the picture projected will be in focus on and just fill the area 66. The border 67 will always have the same illumination from lamp 62 and the picture on area 66 is judged, or compared, under this condition. The density wedge and the lamps are so chosen that if a clear film is in place the light projected through a selected part of the wedge on the light reflecting area 66 will match the transmitted light of border 67. The lamps are preferably in series so that any changes in line voltage will affect both alike.

The film is held stationary while the single frame is inspected. This is first projected through a chosen standard density of the wedge which is such that if the film is of first class quality, the projected image will appear like a first class print on paper on a white mount. If it appears dark, less density is then introduced until the print appears as a good print on a white mount. Sample frames are thus examined. If too little density is used, the border or mount will appear grey. The density wedge is shifted back and forth until the scene balances for density with its white mount, and the setting of the wedge is then noted. At the same time the contrast of the print as actually projected is noted and if it is too flat or too contrasty this can be corrected in making the second print.

This method of judging the positives is in some respects preferable to an actual reading of densities because it takes into account the effect produced on the observer under a standard projection condition. Some scenes have purposely flat or contrasty settings which a mere reading of density measurements does not take into account but which a projection of the picture makes apparent. Moreover density and contrast readings made by diffused light differ from those made under projection conditions with light transmitted through a condenser. This factor has been denoted in the photographic literature as "Callier's Q"; and is taken into account by this instrument.

In Figs. 6 to 9 is shown a slightly modified embodiment of my invention. Most of the parts are similar to those already described and are designated by the same reference characters except for the features particularly to be described. This apparatus has an electric motor 20, connected by gearing 21 with the lower sprocket 76 and by suitable mechanism (not shown for the sake of clearness) with the upper sprocket 76. A friction belt connection 22 drives the take-up reel 77; and a flexible shaft 23 drives an intermittent pulldown, shown conventionally at 24, and mounted on a frame 25. This frame 25 also carries upper and lower guide rolls 26 and the gate structure 27 and is vertically slidable as a whole on the frame 70. The frame 70 carries cross guides 28 on which the film guideway is transversely adjustable, being movable by handle 30. The film 75 is held in the guideway 29 by the presser member 31.

The projection screen is similar to that already described except that in the center of the opaque screen area 66 is a small aperture 32 and behind this aperture is a sheet of material 33 capable of transmitting some light. The density of opacity of this sheet is determined for the particular lamps used in the apparatus and is such that the light transmitted through it from lamp 62 will balance photometrically with the light transmitted from the lamp in lamphouse 72 through the densest portion of the density wedge 81 when projected on the white surface of the screen 66. By this apparatus, the density of a particular portion of any of the images may be photometrically measured in terms of the density wedge. By moving the frame 25 vertically and the gate 29 horizontally any desired portion of a picture area may be projected on the center of the screen 66 about aperture 32 and the wedge may then be adjusted until the portion of the projected image under consideration matches the illumination through the aperture.

There is also shown as applied to this apparatus a recorder comprising a dial 40 removably and rotatably secured on a fixed shaft 41 coaxial with the lower sprocket 76 by the removable button 42 which carries an arm 43 in a definite location. This dial 40 is frictionally secured on a holder having an internal gear 44 driven through a reducing gear train 45 from a pinion at 46 on the sprocket shaft so that the dial rotates at a much slower rate than the sprocket. Around its border at 48 this dial carries a series of numbers which are calibrated to indicate, as they pass the straight edge 49 of arm 43, the number of feet of film passing over the sprocket. There are on the dial a series of concentric rings 50 corresponding in number to the steps of the wedge 81 as shown in Fig 2.

In use, the operator sets a new dial in position with the zero point at the straight edge 49 and determines by comparison in the manner already described the wedge setting at which the first scene appears best. He then makes a mark radially of the zero mark on the corresponding annular ring as at 51. As shown in Fig. 9, marks 51 appear at various radial settings and indicate at just what points printing changes are to be made and what the changes are. When the roll of film has been run through the machine, the indicating dial is removed and sent with the film to guide the printing operator in making the copy.

It is to be understood that memorandum of the printing changes could be tabulated in any way, and the memorandum sent with the film as indicated in my prior application, but the present indicator automatically records the correct footage as the operator merely makes a pencil mark along the straight edge at the determined ring 51.

Having thus described my invention, what I claim as new and desire to secure by Letters Patent is:

1. Means for observing the characteristics of a projected image and comprising a screen, means for uniformly illuminating a definite area only of said screen, means for supporting a carrier with a light transmitting image, and means, including a source of light in a beam and an optical system for projecting light from such an image upon a portion of the screen adjacent to said definite area, and an adjustable filter having portions of different light transmitting properties in said beam between said screen and said light, whereby the image projected under different light conditions may be observed in comparison with said evenly illuminated screen area.

2. Means for observing the characteristics of a projected image and comprising a screen having sharply defined adjacent opaque and light transmitting areas, a source of light behind said screen for uniformly illuminating said light transmitting area, a support for a carrier with a light transmitting image and means, including a source of light behind said support and an optical system, for projecting light in a beam through a carrier in the support upon the opaque area of the screen, and an adjustable filter having portions of different light transmitting properties in the beam between said opaque screen and said light, whereby the image projected under different light conditions may be observed in comparison with said evenly illuminated screen area.

3. Means for observing the characteristics of a projected image and comprising a screen having two sharply defined adjacent areas, one being central of the screen and being opaque and highly reflective, and the second surrounding the first and being light transmitting, a source of light behind the screen for uniformly illuminating the second area, an adjustable support for a light transmitting image carrier and means, including a source of light behind said carrier, and an optical system, for projecting an image of such a carrier in a beam on the opaque area of the screen, and an adjustable filter having portions of different light transmitting characteristics in the beam between said opaque screen and the last named light, whereby the image projected under different light conditions may be observed in comparison with said evenly illuminated screen area, said opaque screen area having a small light transmitting portion with which any point of the projected image may be compared.

4. An instrument for the observation of the printing characteristics of motion picture film and comprising a screen, means for uniformly illuminating a definite area only of said screen, a source of light and an optical system for projecting light in a beam from such source upon an area of the screen contiguous to said definite area, a projection window in said beam and means for advancing motion picture film past said window, and a filter having portions of different light transmitting properties adjustably positioned in said beam, whereby an image of the motion picture film at the window may be projected on the second named screen area under different light conditions and there observed in comparison with the evenly illuminated area.

5. An instrument for the purpose specified including a screen having an area of standard illumination and a second area adjacent thereto, a projection gate, means for moving a motion picture film band past said projection gate, optical means for projecting an image from said gate upon said second screen area, means for varying the illumination of such projected image, and an indicator card separate from the film moved in timed relation to the film moving means and adapted to have noted thereon the observed characteristics of the projected film.

Signed at Rochester, New York, this 18th day of February, 1926.

JOHN GEORGE CAPSTAFF.